(12) United States Patent
Uchiyama et al.

(10) Patent No.: US 7,957,454 B2
(45) Date of Patent: Jun. 7, 2011

(54) TRANSMITTER, RECEIVER, AND DATA COMMUNICATIONS SYSTEM AND METHOD

(75) Inventors: Takuya Uchiyama, Shinagawa (JP); Shigemi Kurashima, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 1056 days.

(21) Appl. No.: 11/245,050

(22) Filed: Oct. 7, 2005

(65) Prior Publication Data

US 2006/0078041 A1    Apr. 13, 2006

(30) Foreign Application Priority Data

Oct. 12, 2004  (JP) ................................ 2004-297717

(51) Int. Cl.
*H04B 1/69* (2006.01)
(52) U.S. Cl. ........ 375/146; 375/130; 375/200; 375/346; 375/216
(58) Field of Classification Search ................. 375/146, 375/130, 346, 238, 295; 342/28
See application file for complete search history.

(56) References Cited

U.S. PATENT DOCUMENTS

| | | | | |
|---|---|---|---|---|
| 5,216,693 A * | 6/1993 | Nakamura | .................... | 375/142 |
| 5,506,862 A * | 4/1996 | McIntosh | ..................... | 375/130 |
| 6,069,928 A * | 5/2000 | Gupta | ............................ | 375/366 |
| 6,725,027 B1 * | 4/2004 | Tsuji et al. | ..................... | 455/296 |
| 7,085,246 B1 * | 8/2006 | LaRosa et al. | ................ | 370/311 |
| 7,190,722 B2 * | 3/2007 | Lakkis et al. | ................. | 375/238 |
| 7,236,513 B2 * | 6/2007 | Iida | ................ | 375/146 |
| 7,353,436 B2 * | 4/2008 | Taha et al. | ..................... | 714/701 |
| 2003/0067963 A1 | 4/2003 | Miller et al. | | |
| 2006/0078077 A1 * | 4/2006 | Karr | ............................ | 375/367 |
| 2008/0285663 A1 * | 11/2008 | Fischer | ......................... | 375/259 |

FOREIGN PATENT DOCUMENTS

JP   4-347943       12/1992
JP   2001-339445    12/2001

OTHER PUBLICATIONS

Japanese Office Action issued on Jan. 5, 2010 in corresponding Japanese Patent Application 2004-297717.

* cited by examiner

*Primary Examiner* — Shuwang Liu
*Assistant Examiner* — Dhaval Patel
(74) *Attorney, Agent, or Firm* — Staas & Halsey LLP

(57) ABSTRACT

There is provided a transmitter that transmits data in a spread spectrum communications system including a spread modulation portion spreading transmitting data with a spread code, an RZ conversion portion converting the transmitting data spread to an RZ signal, and an impulse sequence conversion portion multiplying the RZ signal by an impulse sequence to convert the RZ signal to an impulse radio signal.

16 Claims, 12 Drawing Sheets

CONVERTED INTO RZ FORM (A) TRNAMITTING SIGNAL (B) SIGNAL AFTER SPREAD (C) OUTPUT AFTER CONVERTED TO RZ FORM (D) IMPULSE OUTPUT

TRANSMITTER, RECEIVER, AND DATA COMMUNICATIONS SYSTEM AND METHOD

BACKGROUND OF THE INVENTION

1. Field of the Invention

This invention relates to transmitters, receivers, and data communications systems and methods to communicate with the use of impulse-based UWB (Ultra Wide Band) signals.

2. Description of the Related Art

In the spread spectrum radio communications (Spread Spectrum), there has been proposed the technique for diversifying the correlation characteristics in such a manner that the PN (Pseudorandom Noise) code used in the DS (Direct Sequence) spread system is converted into the RZ (Return to Zero) form and multiplied by the data (refer to Japanese Patent Application Publication No. 4-347943). By converting the PN code to the RZ form, outputs of the PN codes become zero only for a given period, as shown in FIG. 1. The PN codes include both positive and negative values, so the conversion to the RZ form results in three values, positive, negative, and zero.

In recent years, attention has been focused on the UWB-IR (UWB-Impulse Radio) system that enables the large-capacity transmission and sustains multiple users. The UWB-IR system uses an impulse signal equal to or smaller than one nanosecond. The UWB-IR signals are distributed over several GHz frequencies, and can share the frequency bands without interfering with the conventional radio systems.

FIG. 2 shows a configuration of a transmitter in which the data is multiplied by the PN code converted into the RZ form and the impulse sequence. The data is multiplied by the PN code in the RZ form in a first multiplier 4, and then the data is multiplied by an impulse sequence generated in an impulse generator 3.

FIG. 3 shows signal waveforms generated in the transmitter shown in FIG. 2. FIG. 3(B) shows the signal waveform of the PN code. FIG. 3(C) shows the signal waveform of the PN code in the RZ form. FIG. 3(D) shows the signal waveform after the data shown in FIG. 3(A) is multiplied by the PN code in the RZ form and then spread. FIG. 3(E) shows the signal waveform after the spread data shown in FIG. 3(D) is multiplied by the impulse sequence and converted into the impulse radio signals. FIG. 3(F) shows the signal waveform at a receiving end.

The receiving end, however, cannot specify the waveform, when receiving and demodulating the impulse radio signals shown in FIG. 3(E). For, example, if '1' continues in the spread data shown as dotted line in FIG. 3(D), the receiving end cannot specify the signal waveform (namely, the signal shown in FIG. 3(D) in which the spread code is multiplied by the impulse radio signal. This is because when the signal multiplied by the spread code is estimated with the impulse radio signal, multiple signal patterns can be speculated as shown in FIG. 3(G). Accordingly, it is impossible to specify the signal waveform.

SUMMARY OF THE INVENTION

The present invention has been made in view of the above circumstances and provides a transmitter, receiver, a data communications system, and method thereof that readily enable the spread communications with impulse radio signals.

According to one aspect of the present invention, preferably, there is provided a transmitter that transmits data in a spread spectrum communications system including: a spread modulation portion spreading transmitting data with a spread code; an RZ conversion portion converting the transmitting data spread to an RZ signal; and an impulse sequence conversion portion multiplying the RZ signal by an impulse sequence to convert the RZ signal to an impulse radio signal.

According to another aspect of the present invention, preferably, there is provided a receiver that receives an impulse radio signal in which an RZ signal is multiplied by an impulse sequence code including: a receiving portion having n buffers that sequentially receive at intervals of 1/n in one cycle of the RZ signal, where n is an arbitrary natural number; and a demodulation portion that demodulates an output from the buffers to be determined valid. The impulse sequence of the pulse width of picoseconds level enables the UWB communications.

According to still another aspect of the present invention, preferably, there is provided a data communications system in which impulse radio signals are transmitted and received including the above-described transmitter and receiver.

According to yet another aspect of the present invention, preferably, there is provided a method for transmitting data in a spread spectrum communications system including: spreading transmitting data with a spread code; converting the transmitting data spread to an RZ signal; and multiplying the RZ signal by an impulse sequence to convert the RZ signal to an impulse radio signal.

According to yet another aspect of the present invention, preferably, there is provided a method for receiving an impulse radio signal in which an RZ signal is multiplied by an impulse sequence code including: sequentially receiving with n buffers at intervals of 1/n in one cycle of the RZ signal, where n is an arbitrary natural number; and demodulating an output from the buffers to be determined valid.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given, with reference to the accompanying drawings, of embodiments of the present invention.

First Embodiment

Figure 4:
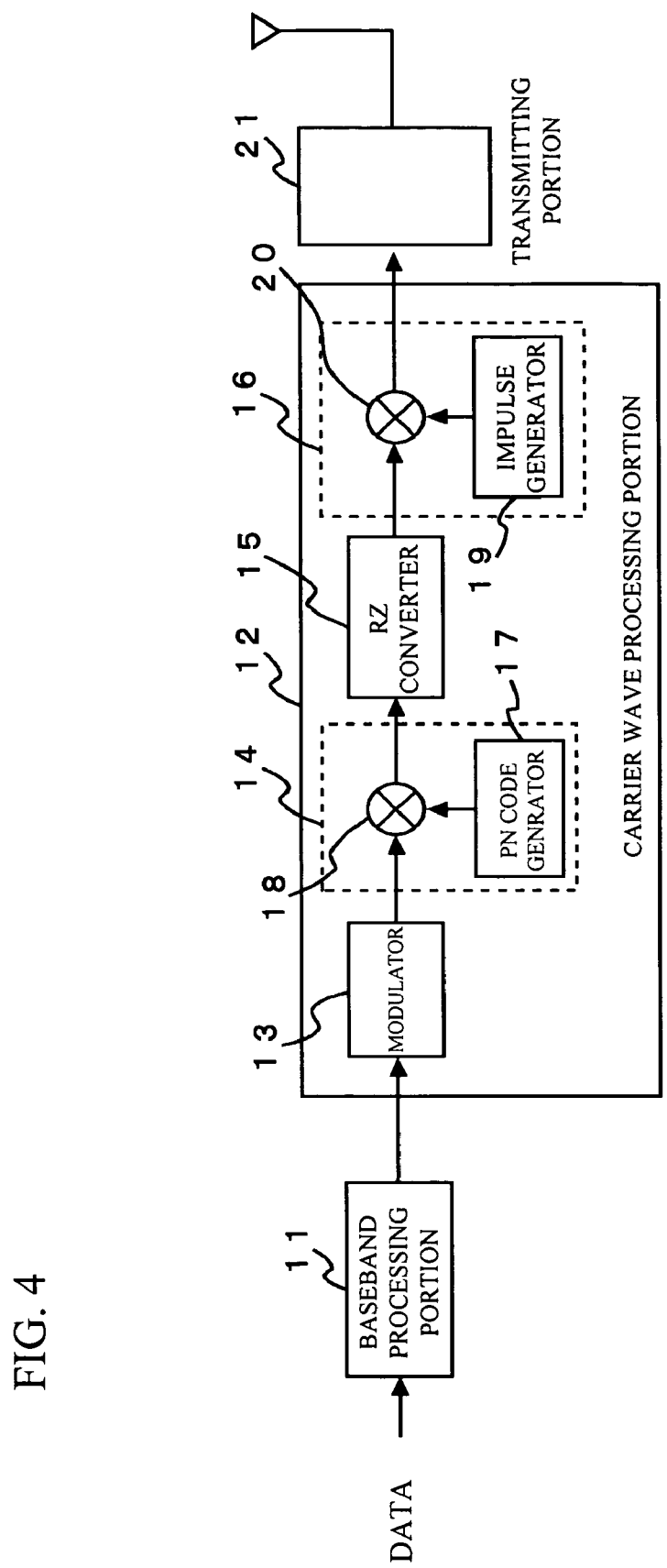
FIG. 4 shows a configuration of a transmitter in accordance with a first embodiment of the present invention.

A description will be given, with reference to FIG. 4, of a transmitter 10 in accordance with a first embodiment of the present invention. The transmitter 10 includes a baseband processing portion 11, a carrier wave processing portion 12, and a transmitting portion 21. The baseband processing portion 11 encodes and compresses a digital sound signal obtained from a codec (not shown) in a given encoding method, puts the signals together in a given block, and outputs to the carrier wave processing portion 12. In the carrier wave processing portion 12, the signal processed by the baseband processing portion 11 is placed on a carrier wave. The carrier wave processing portion 12 includes a modulator 13, a spread modulator 14, an RZ converter 15, and an impulse sequence converter 16. The modulator 13 modulates the data in a given modulation method such as phase modulation. The spread modulator 14 completes the spread modulation with the PN code. The RZ converter 15 converts the signal that has completed the spread modulation, to the RZ form. The impulse sequence converter 16 converts the signal in the RZ form to the impulse radio signal. The spread modulator 14 is equipped with a PN code generator 17 and a first multiplier 18. The impulse sequence converter 16 is equipped with an impulse generator 19 and a second multiplier 20. The output from the impulse sequence converter 16 is electrically amplified to a desired level in the transmitting portion 21 and transmitted wirelessly via an antenna.

Figure 6:
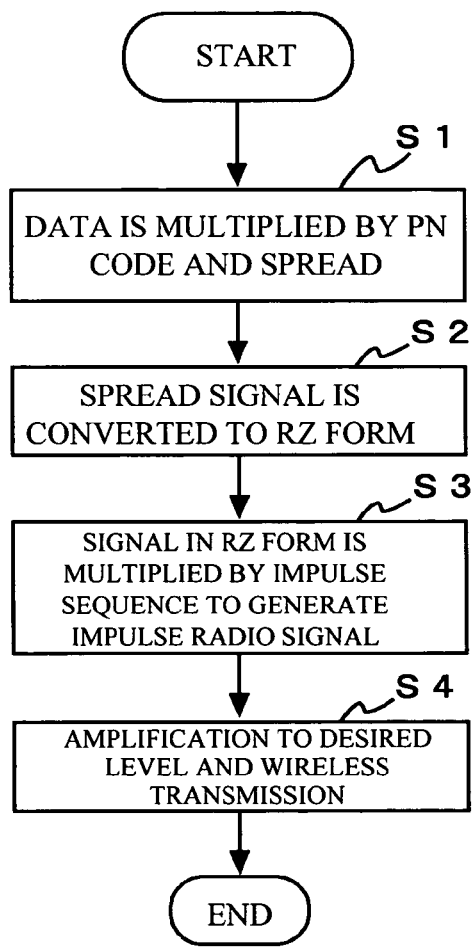
FIG. 6 is a flowchart showing a procedure of the transmitter.

A description will now be given, with reference to a flowchart shown in FIG. 6, of a procedure of the carrier wave processing portion 12. In accordance with the first embodiment of the present invention, as shown in FIG. 4, the modulated signal is multiplied by PN code in the first multiplier 18 (step S1), and the signal that has been spread is converted into the RZ form (step S2). Then, the signal that has been converted into the RZ form is multiplied by the impulse sequence to convert to the impulse radio signal (step S3). The impulse ratio signal is output from the antenna after the electricity level is adjusted (step S4).

Figure 5:
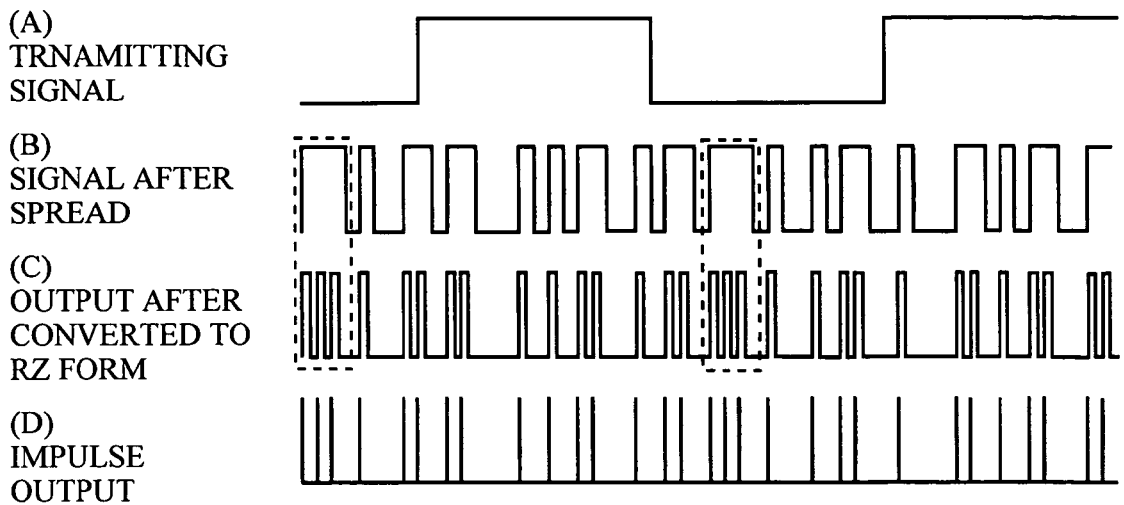
FIG. 5 shows the waveforms in the transmitter in accordance with the first embodiment of the present invention.

FIG. 5 shows the waveforms in the carrier wave processing portion 12. The signal that has been spread shown in FIG. 5(B) is generated by multiplying the transmitting signal that has been modulated in the modulator 13 by the PN code in the PN code generator 17. Then, the afore-mentioned generated signal is converted into the RZ form in the RZ converter 15 as shown in FIG. 5(C). The afore-mentioned signal in the RZ form is multiplied by the impulse sequence to generate the impulse radio signal as shown in FIG. 5(D). With respect to the impulse sequence, each phase of the impulse is adjusted according to the spread code. The impulse sequence is multiplied by the signal converted into the RZ form for the pulse-position modulation.

Figure 1:
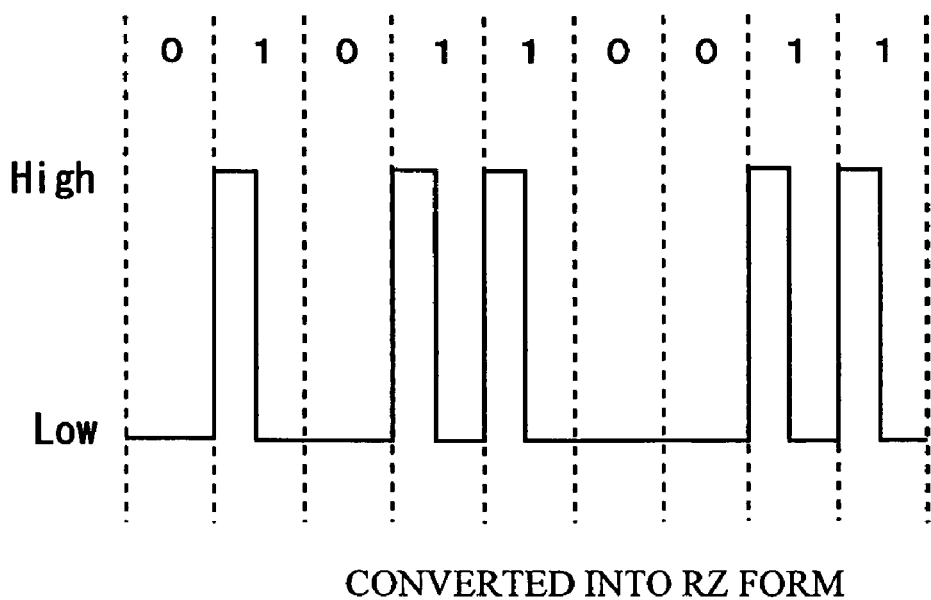
FIG. 1 illustrates an RZ signal.
Figure 2:
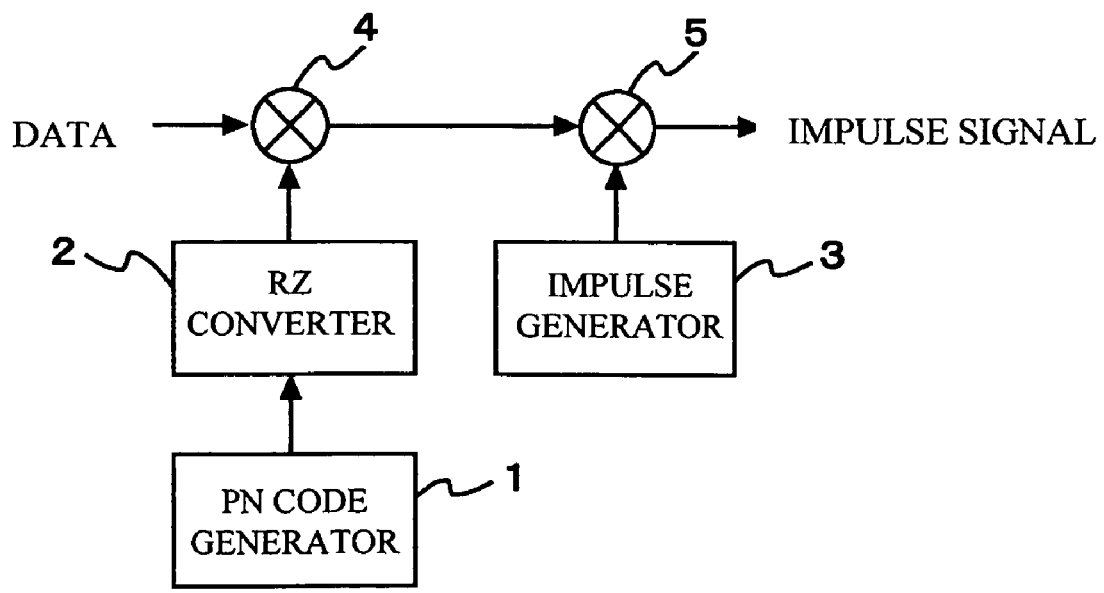
FIG. 2 shows a configuration of a conventional transmitter.
Figure 3:
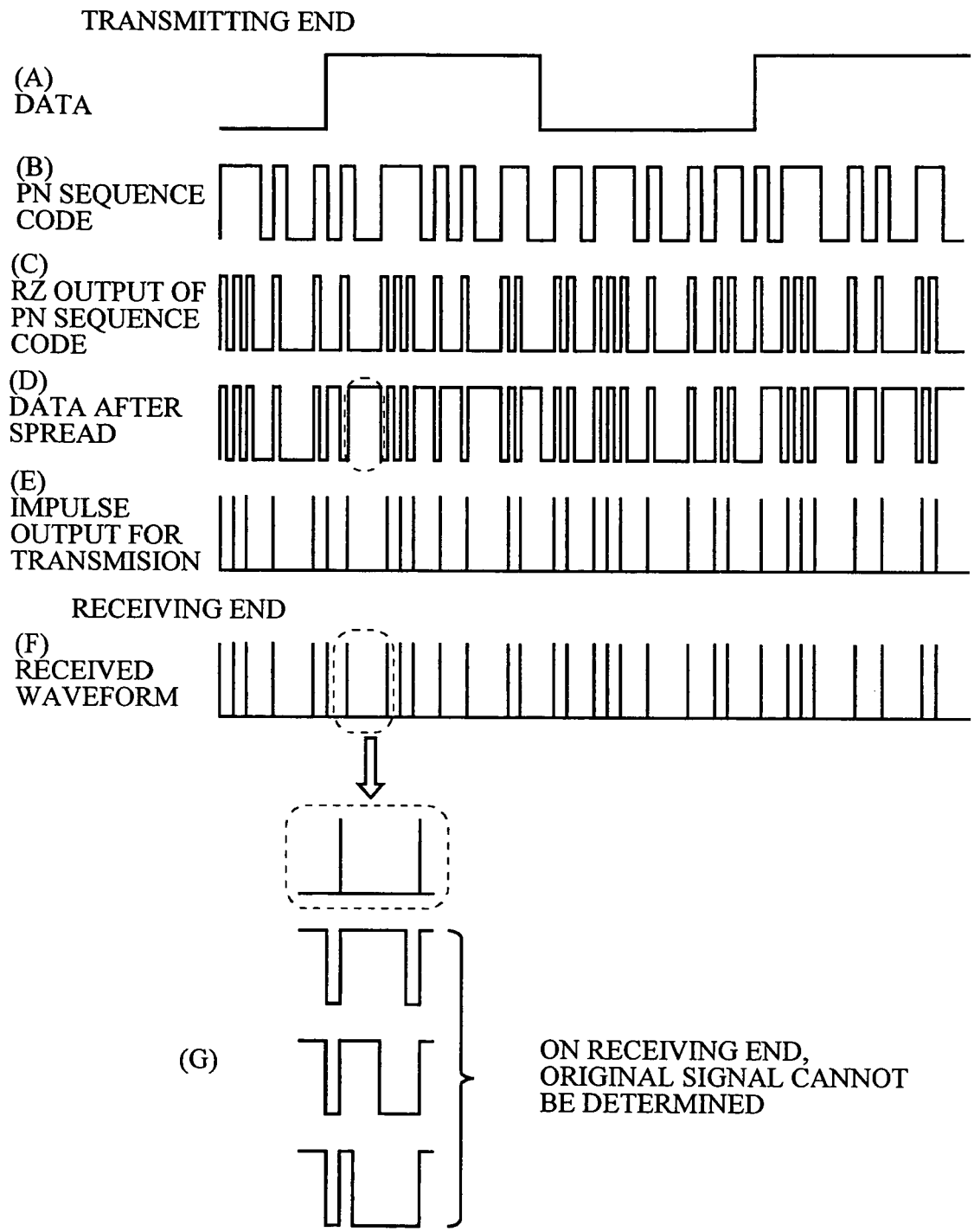
FIG. 3 shows signal waveforms generated in the conventional transmitter.

The impulse sequence converter 16, as shown in FIG. 5(D), generates the impulse radio signal in synchronization with a rising edge of the input signal. Therefore, as shown in FIG. 3G, the receiving end may not determine the signal waveform in some cases, when the impulse radio signal is generated by multiplying the signal after the spread modulation by the impulse sequence.

In contrast, in accordance with the first embodiment of the present invention, the data is converted into the RZ form after spread by the PN code. Hence, even if '1' continues in the signal after spread as shown in FIG. 5(B), it is possible to reflect the continuous '1' after the RZ conversion, as shown in FIG. 5(C). Despreading can be accomplished properly at the receiving end, even if the signal in the RZ form (hereinafter, simply referred to as RZ signal) is converted into the impulse radio signal.

With a pulse width of the impulse sequence generated from the impulse generator 19 set to be several picoseconds, the impulse radio signal will be able to utilize a wide range of frequencies for transmission, from 3.1 GHz to 10.6 GHz, namely, the ultra wide band (UWB) communication.

Figure 7:
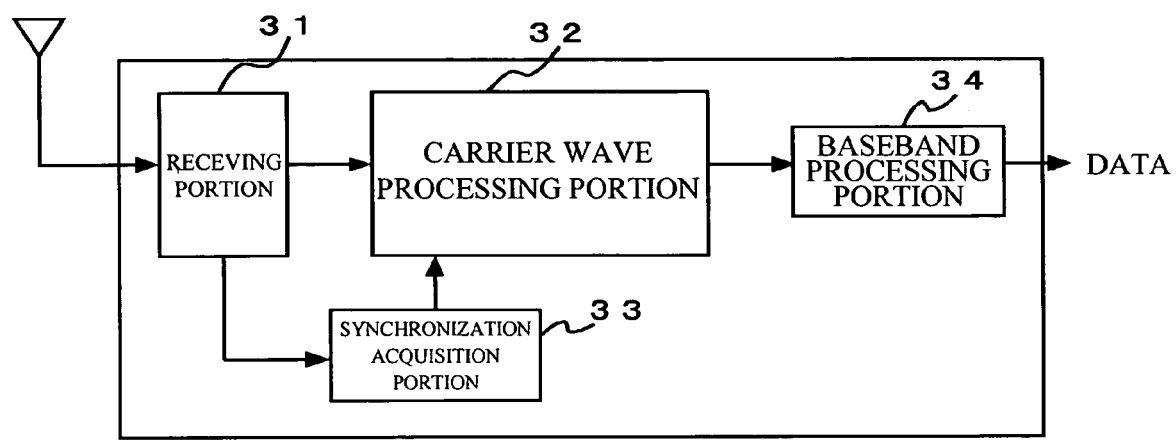
FIG. 7 shows a configuration of a receiver in accordance with the first embodiment of the present invention.

A description will now be given, with reference to FIG. 7, of a configuration of a receiver 30. The receiver 30, as shown in FIG. 7, includes a receiving portion 31, a carrier wave processing portion 32, a synchronization acquisition portion 33, and a baseband processing portion 34. The signal received from the antenna is temporarily stored in a buffer in the receiving portion 31. The carrier wave processing portion 32 obtains the received signal from the receiving portion 31 and generates the baseband signal with the despreading operation or demodulation. The synchronization acquisition portion 33 detects a data receive timing and notifies the receive timing that has been detected to the carrier wave processing portion 32 in order to obtain the data from the signal received from the antenna. The baseband processing portion 34 performs the A/D conversion of the signal output from the carrier wave processing portion 32, removes the influence such as phasing, determines the type of the received signal, corrects the error, and decodes the signal properly, so that the sound data is separated from other communications data. The sound data is supplied to the codec (not shown) included in a DSP (Digital Signal Processor).

Figure 8:
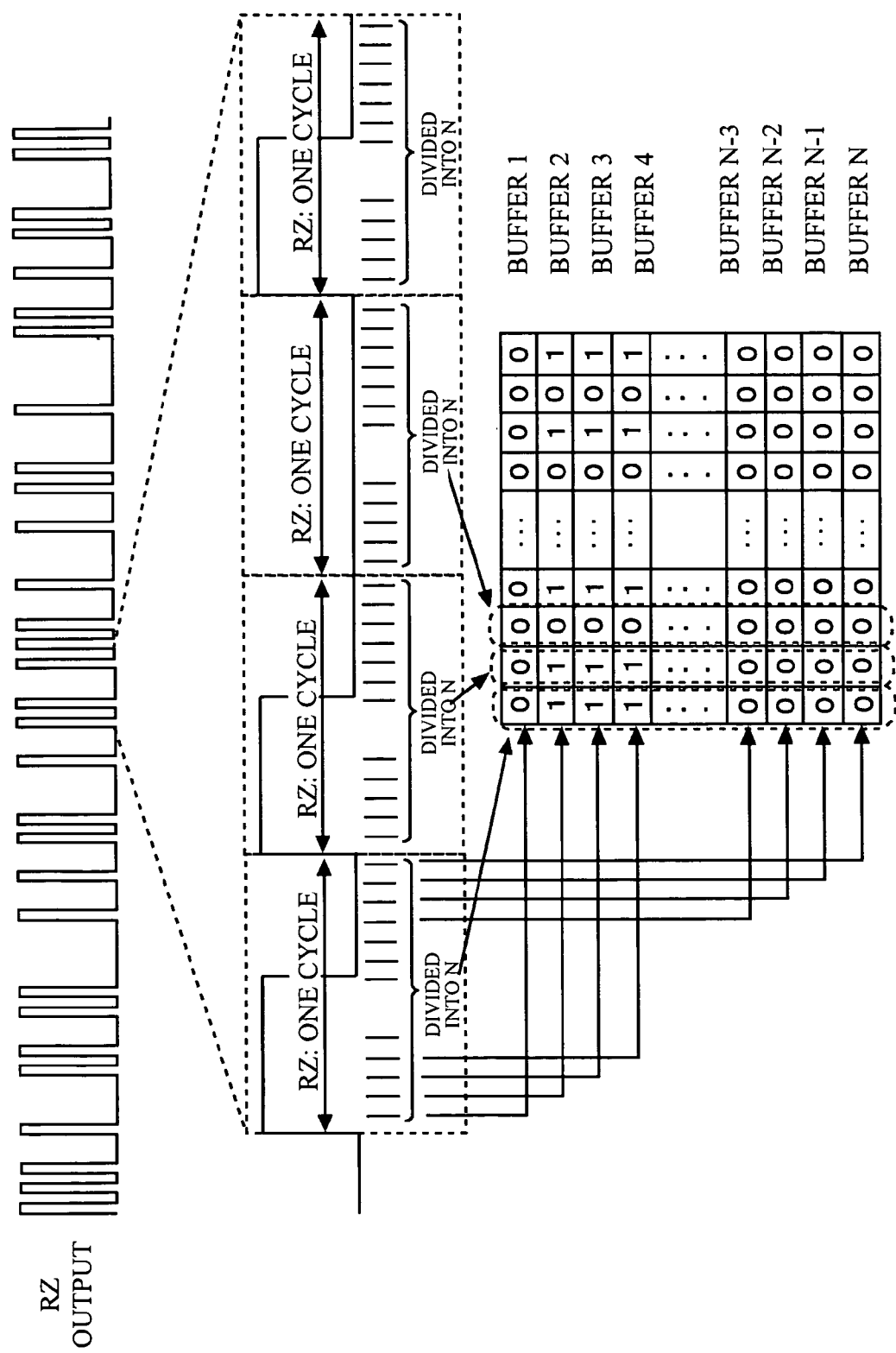
FIG. 8 shows a configuration of the buffer provided in a receiving portion.
Figure 11:
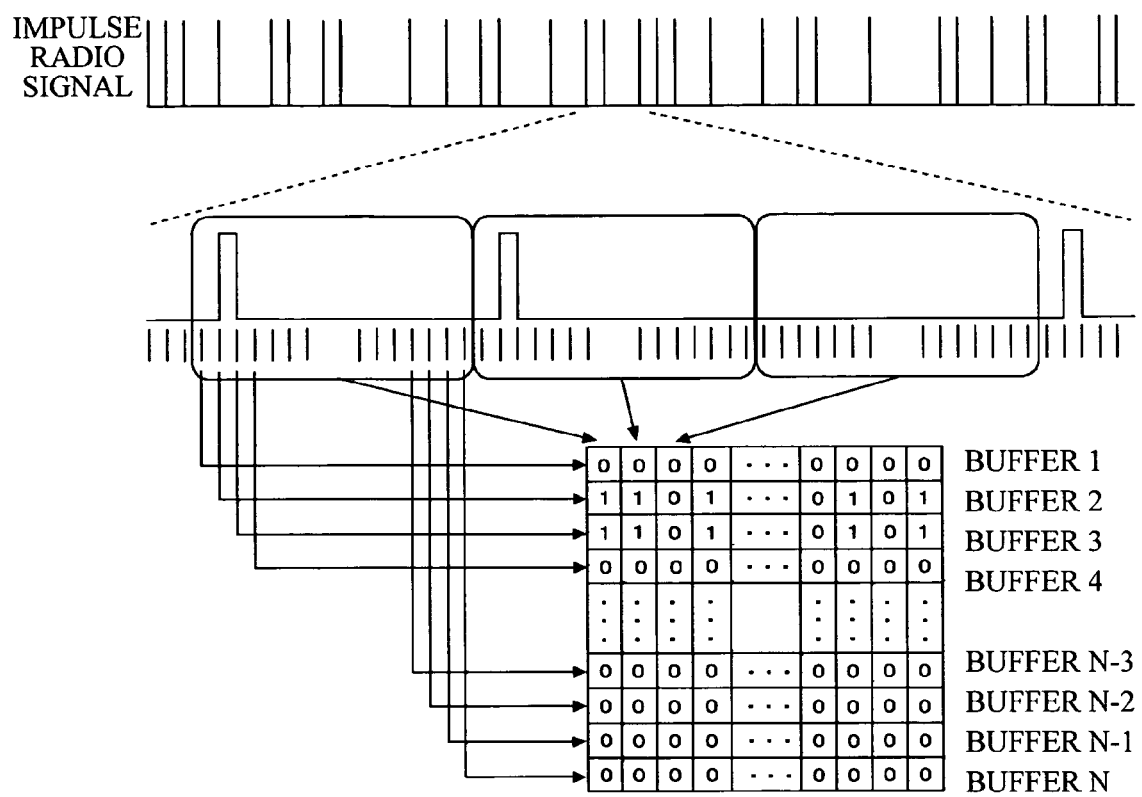
FIG. 11 illustrates the buffer in the receiving portion.

FIG. 8 shows a configuration of the buffer provided in the receiving portion 31. The buffer in accordance with the first embodiment of the present invention is composed of n buffers as shown in FIG. 8. The signals are sequentially input into the buffers 1 through n in such a manner that one cycle of the RZ signal is divided into n, the signal received in a first 1/n segment is input into the buffer 1, and the signal received in the subsequent 1/n segment is input into the buffer 2. FIG. 11 shows how the signals are input. In this manner, the buffers for receiving the signals are shifted by the 1/n segment. When the subsequent cycle starts, the signal is input into the buffer 1 again. That is to say, the buffers 1 though n receive the data in the same segment in each cycle of the RZ signal. The signals received by the buffers 1 through n are determined whether valid or invalid. The reliability in demodulation can be enhanced by using only the valid signal for demodulation.

The buffers 1 through n respectively receive the signals provided in the same segment in each spread cycle. When the signal stored in any buffer corresponds to the PN code, it is determined that the synchronization has been acquired and then despreading operation is performed with the use of the output from the corresponding buffer. This facilitates the despreading operation of the spread data output in the RZ form. Furthermore, the signals are sequentially input into the n buffers at intervals of 1/n (n is an arbitrary natural number) in one cycle of the RZ signal. It is therefore possible to demodulate without establishing synchronization with the impulse radio signal.

Figure 9:
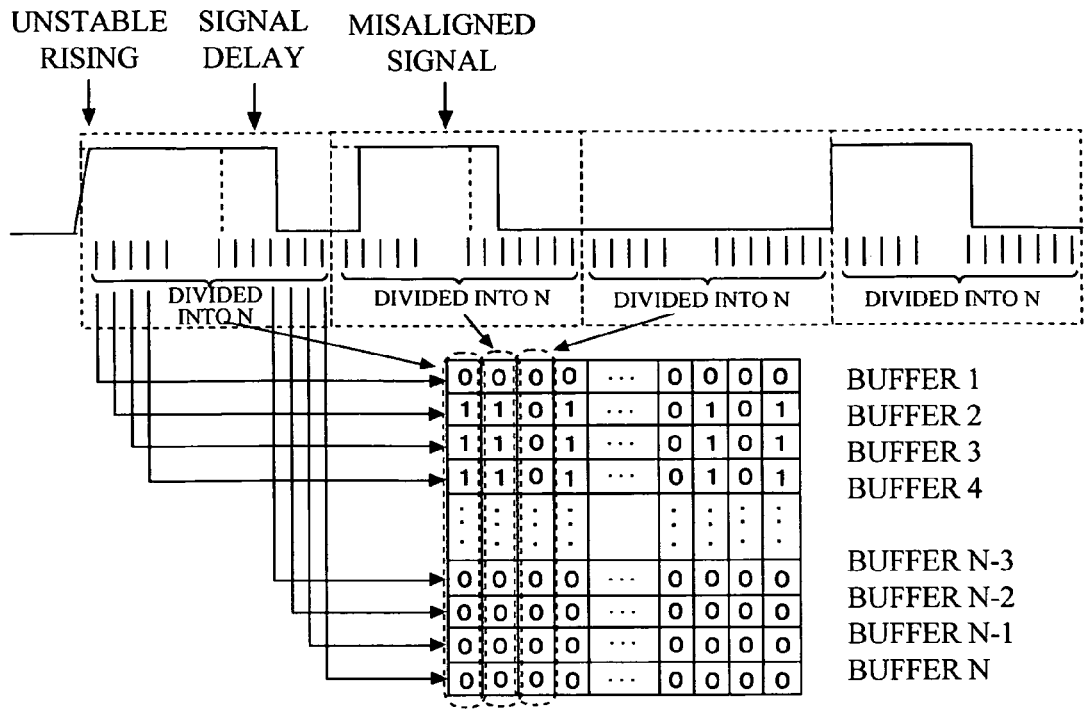
FIG. 9 illustrates the buffer in the receiving portion.

Referring to FIG. 9, if the received signal is unstable in rising and trailing edges and delay or misalignment occurs in signal, the waveform of transmitting signal is different from that of the receiving signal. In this case, the output from the buffer, if it is determined that the correct signal is not received, should not be used. Instead, the data can be demodulated correctly by determining that the signal received in the middle of the buffer is valid.

Figure 10:
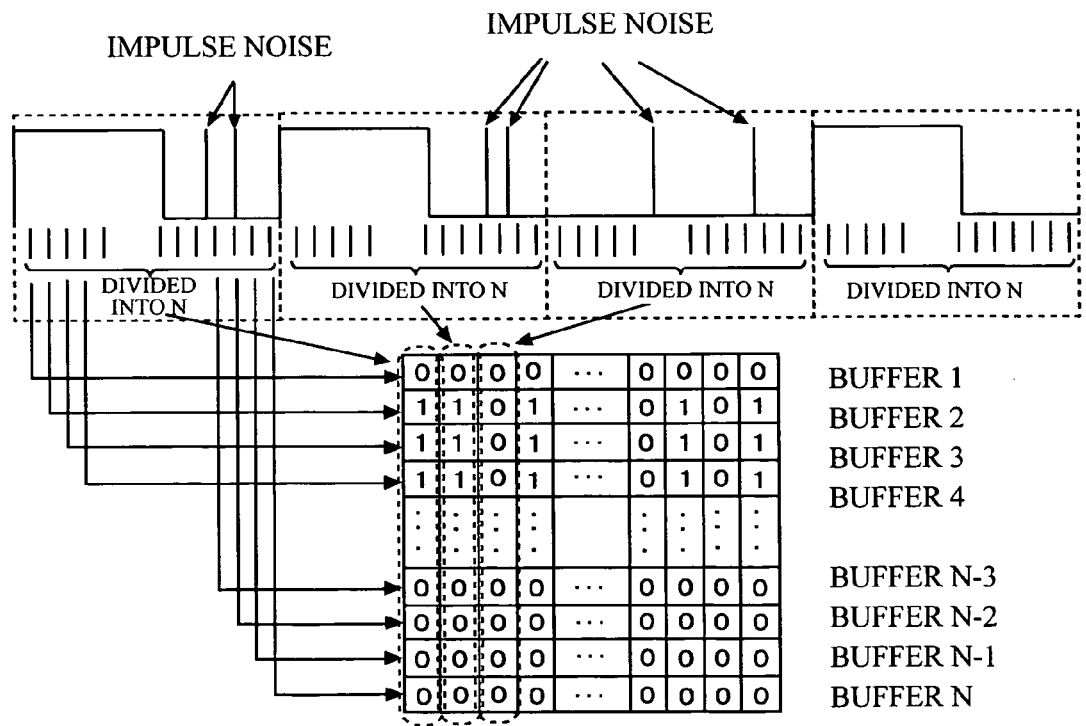
FIG. 10 illustrates the buffer in the receiving portion.

With respect to the intervals when the buffers 1 through n receive the signal, the influence of the impulse noise can be eliminated, by setting the intervals in consideration of the afore-mentioned noise. That is to say, as shown in FIG. 10, the receiving intervals of the buffers 1 through n are elongated than the intervals between the occurrences of the impulse noises so that the multiple buffers may not be affected by the same impulse noise. This makes it possible to receive the data correctly.

Figure 12:
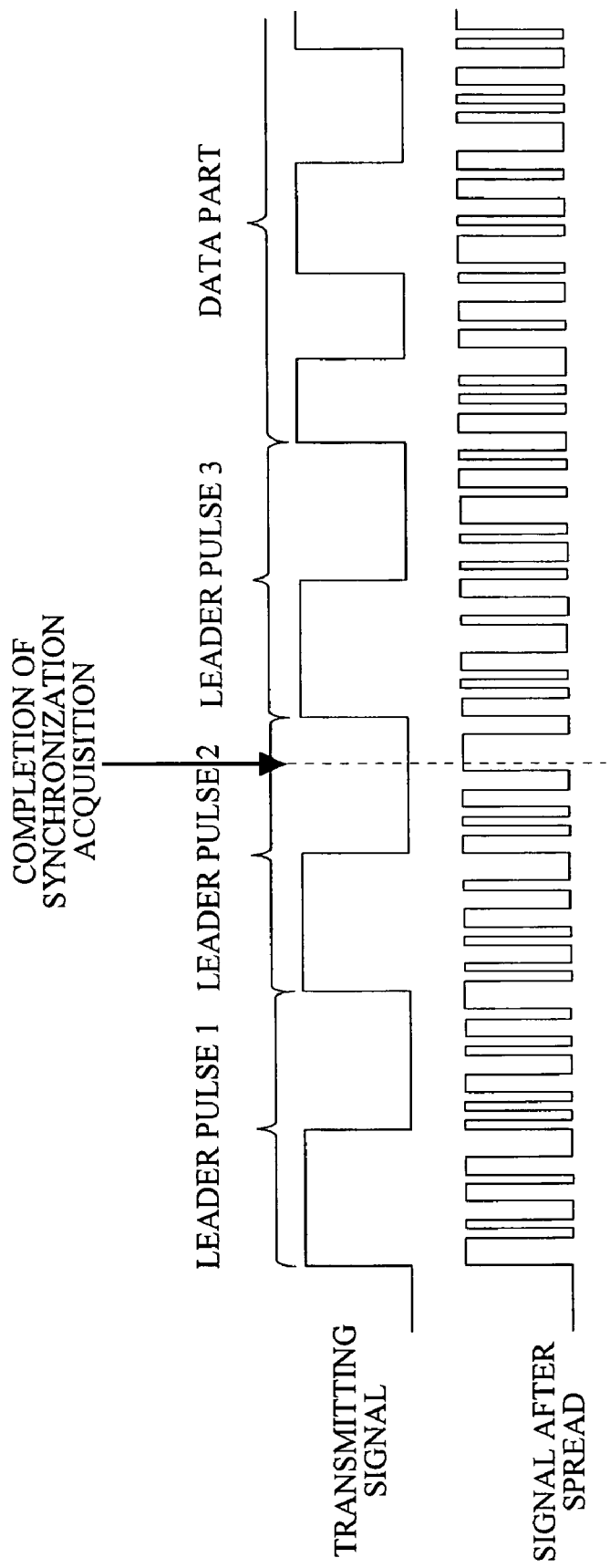
FIG. 12 illustrates synchronization acquisition.

A description will now be given of the operation of the synchronization acquisition portion 33. When the signal that has been modulated by the pulse-position modulation is transmitted and received, a reference signal, known as leader pulse, is transmitted to establish the synchronization between the transmitter and receiver prior to the data transmission. In accordance with the first embodiment of the present invention, the leader pulse signal is transmitted several times as shown in FIG. 12, and the receiver 30 receives the leader pulse signal to acquire the synchronization.

Figure 13:
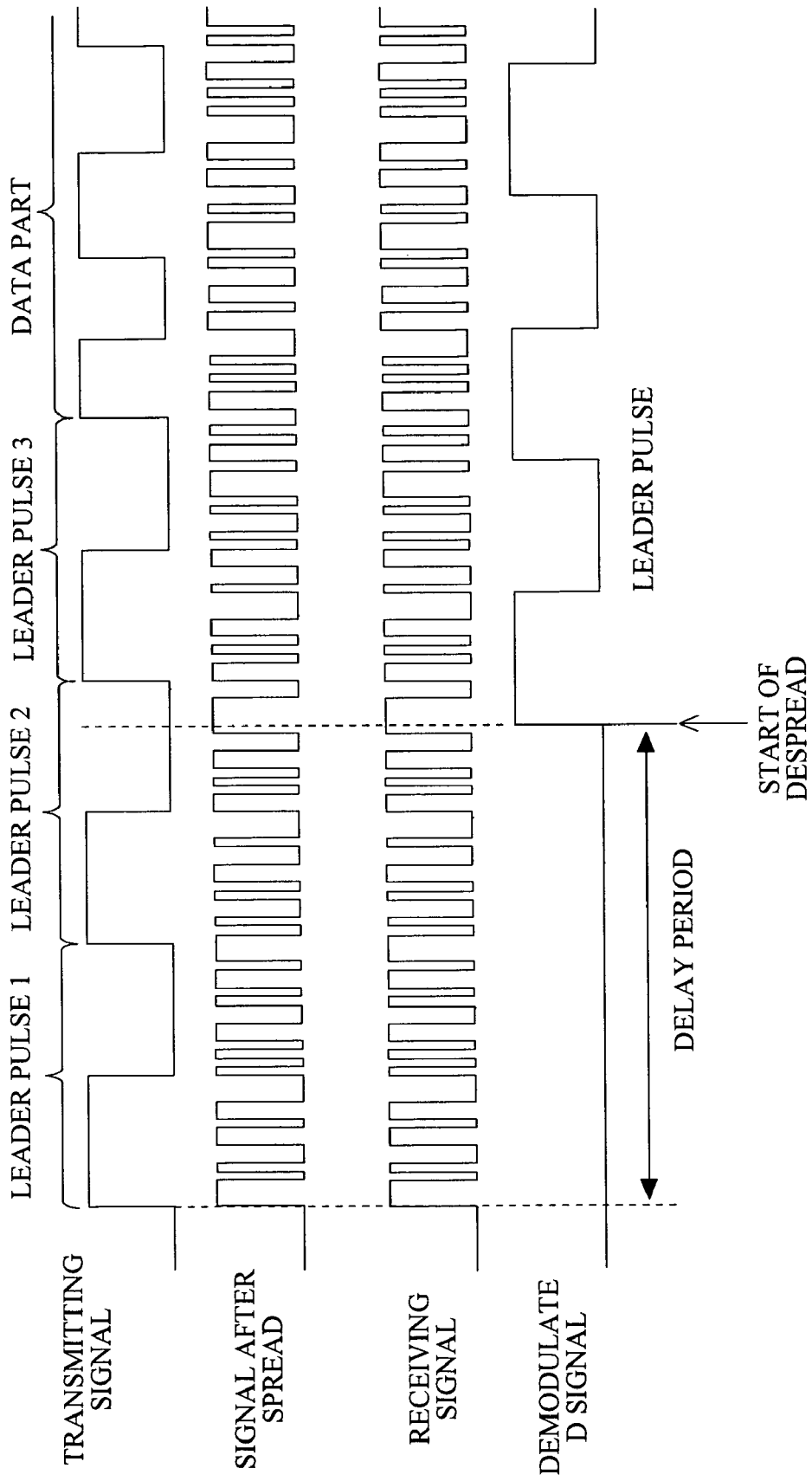
FIG. 13 illustrates the synchronization acquisition.
Figure 14:
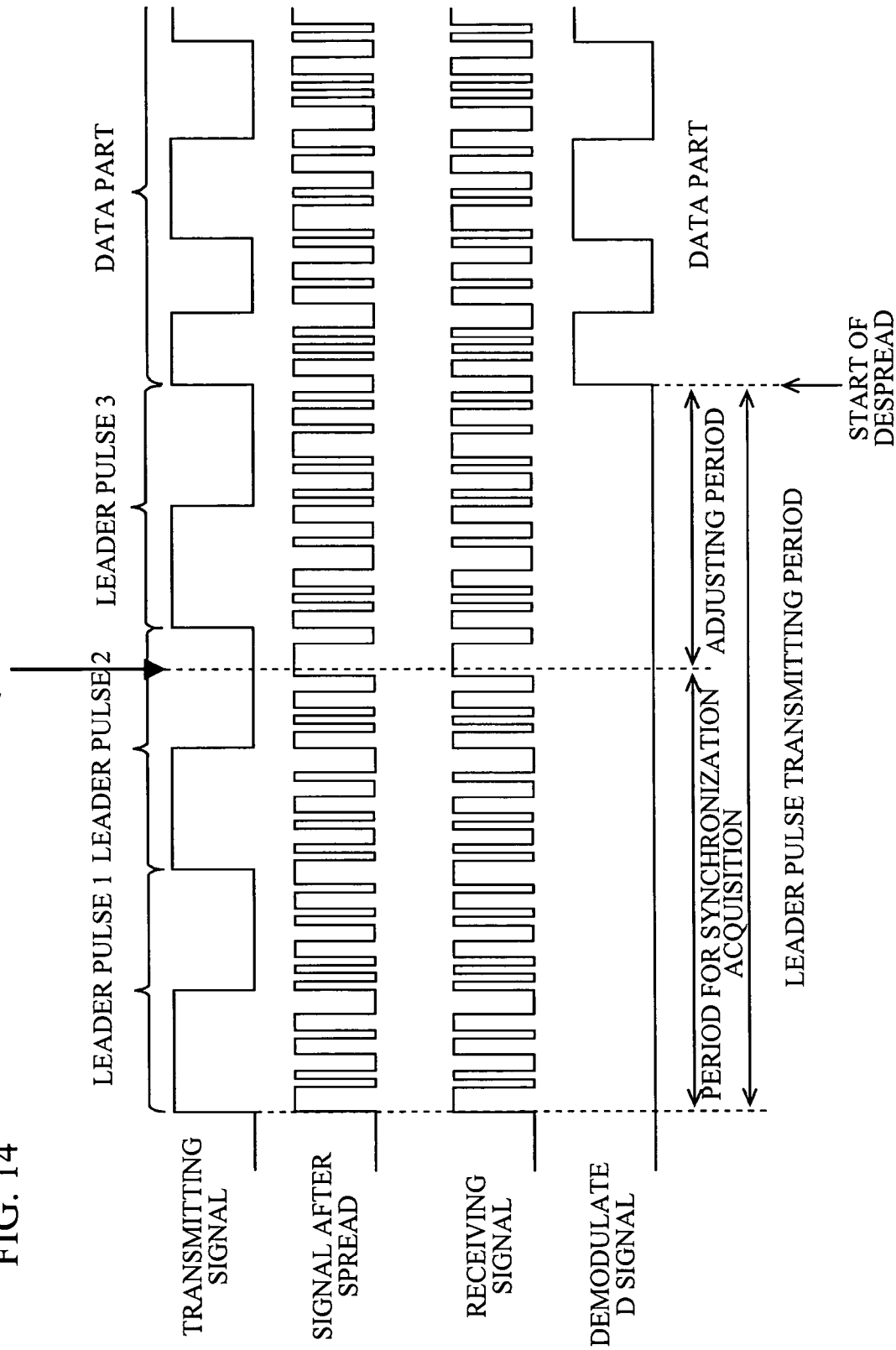
FIG. 14 illustrates the synchronization acquisition.
Figure 15:
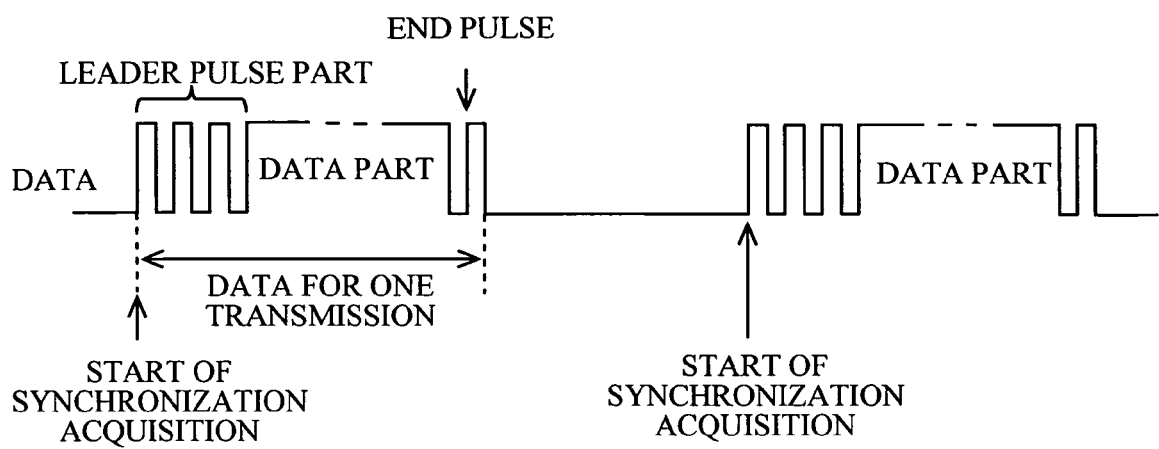
FIG. 15 illustrates the synchronization acquisition.

Generally, after the synchronization is acquired, despreading operation is performed. However, as shown in FIG. 13, a delay occurs because the despreading operation is also performed for the leader pulse part. In accordance with the first embodiment of the present invention, only the despreading operation is performed for the data part to be received subsequent to the leader pulse part, as show in FIG. 14. This shortens the delay time for data recovery. The period necessary for acquiring the synchronization can be calculated with the received PN code and the number of chips corresponding to the reference code prepared in the receiver 30. In addition, the transmitting period of the leader pulse is already known, and the period for adjusting is delayed from the accomplishment of the synchronization, as shown in FIG. 14. Then, the despreading operation is performed at the data receive timing.

Furthermore, according to the present embodiment, one transmitting period (transmitting period of one symbol) is set to several milliseconds, and the receiver 30 acquires the synchronization each time receiving the signal. The transmitting period is configured not to become misaligned. This eliminates the necessity of acquiring the synchronization in the transmitting period. The receiver 30 again acquires the synchronization in the subsequent transmitting period. It is possible to achieve the spread spectrum communications without acquiring the synchronization.

The present invention is not limited to the above-mentioned embodiments, and other embodiments, variations and modifications may be made without departing from the scope of the present invention.

The present invention is based on Japanese Patent Application No. 2004-297717 filed on Oct. 12, 2004, the entire disclosure of which is hereby incorporated by reference.

What is claimed is:

1. A transmitter that transmits a transmission signal to a receiver in a spread spectrum communications system, comprising:
    a spread modulation portion spreading a transmission signal with a spread code into spread data;
    an RZ conversion portion converting the spread data into an RZ signal; and
    an impulse sequence conversion portion multiplying the RZ signal by an impulse sequence to convert the RZ signal to an impulse radio signal including a series of impulses in the spread data, and transmits the transmission signal converted into the impulse radio signal to the receiver,
    wherein the receiver demodulates the transmission signal without establishing synchronization with the impulse radio signal wherein a demodulation portion that selects, from the n buffers, a buffer in which a signal level of the transmission signal stored into each buffer corresponds with a spread code used for the spreading of the transmission signal by the transmitter, and demodulates the transmission signal based on the signal level stored into the selected buffer.

2. The transmitter as claimed in claim 1, wherein the impulse sequence has a pulse width of picoseconds level.

3. A receiver that receives a transmission signal from a transmitter in a spread spectrum communications system, comprising:
    a receiving portion that receives a transmission signal converted into an impulse radio signal from the transmitter
    n buffers that sequentially store signal levels of one cycle of the transmission signal at timing in which the one cycle of the received transmission signal is divided into n, where n is an arbitrary natural number, each buffer having a plurality of storage areas for storing transmission signals over a plurality of cycles; and
    a demodulation portion that selects, from the n buffers, a buffer in which the signal level of the transmission signal stored into each buffer corresponds with a spread code used for the spreading of the transmission signal by the transmitter, and demodulates the transmission signal based on the signal level stored into the selected buffer.

4. The receiver as claimed in claim 3, wherein the receiver demodulates the transmission signal stored into the selected buffer without establishing synchronization with the impulse radio signal.

5. The receiver as claimed in claim 3, further comprising a synchronization acquisition portion acquiring a synchronization with a leader pulse to be transmitted several times from a transmitting end.

6. The receiver as claimed in claim 5, further comprising a despread portion dispreading only data to be received subsequent to the leader pulse.

7. The receiver as claimed in claim 5, wherein the synchronization acquisition portion acquires the synchronization each time receiving the transmission signal being transmitted for a given transmitting period.

8. A data communications system in which transmission signals are transmitted and received comprising:
    a transmitter; and
    a receiver,
    the transmitter including a spread modulation portion spreading a transmission signal with a spread code into spread data, an RZ conversion portion converting the spread data into an RZ signal, and an impulse sequence conversion portion multiplying the RZ signal by an impulse sequence to convert the RZ signal to an impulse radio signal including a series of impulses in the spread data, and transmits the transmission signal converted into the impulse radio signal to the receiver,
    the receiver including a receiving portion that receives the transmission signal converted into the impulse radio signal from the transmitter;
    n buffers that sequentially store signal levels of one cycle of the transmission signal at timing in which the one cycle of the received transmission signal is divided into n, wherein n is an arbitrary natural number, each buffer having a plurality of storage areas for storing transmission signals over a plurality of cycles; and
    a demodulation portion that selects, from the n buffers, a buffer in which the signal level of the transmission signal stored into each buffer corresponds with a signal level of a spread code used for the spreading of the transmission signal by the transmitter, and demodulates the transmission signal based on the signal level stored into the selected buffet.

9. A method for transmitting a transmission signal from a transmitter to a receiver in a spread spectrum communications system comprising:
spreading a transmission signal with a spread code into spread data;
converting the spread data into an RZ signal; and
multiplying the RZ signal by an impulse sequence to convert the RZ signal to an impulse radio signal including a series of impulses in the spread data, and transmitting the transmission signal converted into the impulse radio signal to the receiver, wherein
the receiver demodulates the transmission signal without establishing synchronization with the impulse radio signal where a demodulation portion that selects, from the n buffers, a buffer in which a signal level of the transmission signal stored into each buffer corresponds with a spread code used for the spreading of the transmission signal by the transmitter, and demodulates the transmission signal based on the signal level stored into the selected buffer.

10. The method as claimed in claim 9, wherein the impulse sequence has a pulse width of picoseconds level.

11. A method of transmitting a transmission signal, comprising:
spreading a transmission signal with a spread code into spread data;
converting the spread data into RZ spread data;
converting the RZ spread data into an impulse radio signal;
transmitting the transmission signal converted into the impulse radio signal;
receiving the transmission signal converted into the impulse radio signal;
sequentially storing into n buffers signal levels of one cycle of the transmission signal at timing in which the one cycle of the received transmission signal is divided into n, wherein n is an arbitrary natural number, each buffer having a plurality of storage areas for storing transmission signals over a plurality of cycles;
selecting, from the n buffers, a buffer in which the signal level of the transmission signal stored into each buffer corresponds with a signal level of a spread code used for the spreading of the transmission signal by the transmitter; and
demodulating the transmission signal based on the signal level stored into the selected buffer.

12. A method for receiving a transmission signal from a transmitter in a spread spectrum communications system, comprising:
receiving a transmission signal converted into an impulse radio signal from the transmitter;
sequentially storing into n buffers signal levels of one cycle of the transmission signal at timing in which the one cycle of the received transmission signal is divided into n, wherein n is an arbitrary natural number, each buffer having a plurality of storage areas for storing transmission signals over a plurality of cycles;
selecting, from the n buffers, a buffer in which the signal level of the transmission signal stored into each buffer corresponds with a signal level of a spread code used for the spreading of the transmission signal by the transmitter; and
demodulating the transmission signal based on the signal level stored into the selected buffer.

13. The method as claimed in claim 12, wherein the transmission signal stored into the selected buffer is demodulated without establishing synchronization with the impulse radio signal.

14. The method as claimed in claim 12, further comprising acquiring a synchronization with a leader pulse to be transmitted several times from a transmitting end.

15. The method as claimed in claim 14, further comprising dispreading only data to be received subsequent to the leader pulse.

16. The method as claimed in claim 14, wherein the synchronization is acquired each time a signal being transmitted for a given transmitting period is received.

* * * * *

UNITED STATES PATENT AND TRADEMARK OFFICE
CERTIFICATE OF CORRECTION

| | | |
|---|---|---|
| PATENT NO. | : 7,957,454 B2 | Page 1 of 1 |
| APPLICATION NO. | : 11/245050 | |
| DATED | : June 7, 2011 | |
| INVENTOR(S) | : Takuya Uchiyama et al. | |

It is certified that error appears in the above-identified patent and that said Letters Patent is hereby corrected as shown below:

Column 6, line 12, change "transmitter" to --transmitter;--.

Column 7, line 3, change "buffet." to --buffer.--.

Signed and Sealed this
Sixteenth Day of August, 2011

David J. Kappos
*Director of the United States Patent and Trademark Office*